(12) United States Patent
Pawlow et al.

(10) Patent No.: US 8,436,111 B2
(45) Date of Patent: May 7, 2013

(54) NICKEL CATALYST SYSTEM FOR THE PREPARATION OF HIGH CIS POLYBUTADIENE

(75) Inventors: James H. Pawlow, Akron, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 751 days.

(21) Appl. No.: 12/571,889

(22) Filed: Oct. 1, 2009

(65) Prior Publication Data

US 2010/0093920 A1  Apr. 15, 2010

Related U.S. Application Data

(60) Provisional application No. 61/101,827, filed on Oct. 1, 2008.

(51) Int. Cl.
*C08F 4/44* (2006.01)
*C08F 4/52* (2006.01)
*C08F 36/00* (2006.01)

(52) U.S. Cl.
USPC ........... 526/138; 526/137; 526/131; 526/132; 526/133; 526/161; 526/172; 526/169.1; 526/335; 502/114; 502/103; 502/121; 502/123; 502/124; 502/128

(58) Field of Classification Search ............... 526/169.1, 526/169, 161, 172, 133, 148, 131, 132, 137, 526/335, 138; 502/119, 128; 556/138
See application file for complete search history.

(56) References Cited

U.S. PATENT DOCUMENTS

| | | | | | |
|---|---|---|---|---|---|
| 4,192,366 | A | * | 3/1980 | Scriver et al. | 152/209.1 |
| 6,800,702 | B2 | * | 10/2004 | Wass | 526/124.3 |
| 7,022,788 | B2 | * | 4/2006 | Wass | 526/172 |
| 7,361,623 | B2 | * | 4/2008 | Dixon et al. | 502/150 |
| 7,956,141 | B2 | * | 6/2011 | Suzuki et al. | 526/172 |

OTHER PUBLICATIONS

Zhang, L. et al., Angew. Chem. Int. Ed., 2007, 46, 1909.
Sun, Z. et al., Acta Polymerica Sinica 2007, 1, 59.
Hou, J. et al., Organometallics 2006, 25, 236.
Liang, L. et al., Organometallics 2003, 22, 3007.

\* cited by examiner

*Primary Examiner* — Rip A. Lee
(74) *Attorney, Agent, or Firm* — Meredith E. Hooker; Jenny L. Sheaffer

(57) ABSTRACT

Embodiments relate to a novel catalyst composition comprising a transition metal-containing compound, a PNP compound, an alkylating agent and a fluorine containing compound. Other embodiments relate to a method of polymerizing a diene monomer in the presence of the novel composition to form a diene-containing polymer having greater than 90% cis content.

23 Claims, 1 Drawing Sheet

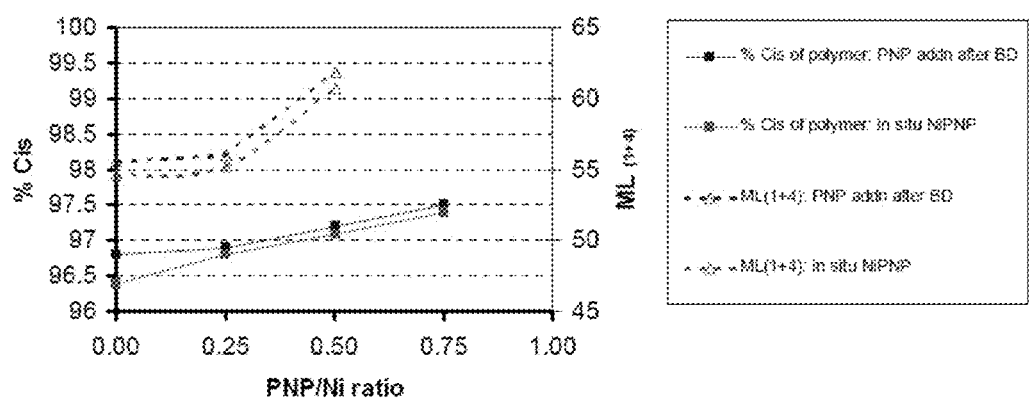

NICKEL CATALYST SYSTEM FOR THE PREPARATION OF HIGH CIS POLYBUTADIENE

CROSS REFERENCE TO RELATED APPLICATIONS

This application claims the benefit of Provisional Application No. 61/101,827 filed Oct. 1, 2008, which is incorporated herein by reference.

FIELD OF INVENTION

The embodiments relate to catalyst systems for the preparation of high cis polydienes.

BACKGROUND

Polymerization of dienes has generally been performed using various catalyst systems including rare-earth metals and nickel-based catalyst systems. For example, the catalysts for the cis-1,4 polymerization of butadiene are Ziegler-Natta (ZN)-type multi-component systems comprised of a rare-earth metal (e.g., Nd) carboxylate, ethyl-aluminum chloride, isobutyl aluminum hydride. Cis-1,4-polybutadiene has been produced by polymerization of 1,3-butadiene using a ZN catalyst system containing $Ni(OOC_8H_{15})_2$, and $Al(C_2H_5)_3$ and the Lewis acids $BF_3O(C_2H_5)_2$ or $TiCl_4$.

Transition metal-containing (e.g., nickel-based) catalyst systems generally produce polybutadiene with a cis content between 92-97%. The vast majority of the transition metal-containing catalyst systems use no ligands, and use what is referred to as "naked" transition metal such as "naked" nickel. PNP compounds have been used in lanthanide and early transition metal based systems, but have not seen usage in late transition metal (i.e. nickel) catalyst systems for the polymerization of butadiene.

SUMMARY OF THE INVENTION

The embodiments relate to a catalyst composition comprising a transition metal-containing compound, a PNP compound, an alkylating agent and a fluorine containing compound, and method for forming the same.

Additional embodiments relate to the polymer resulting from the method comprising polymerizing a diene monomer in the presence of a catalyst composition comprising a transition metal-containing compound, a PNP compound, an alkylating agent and a fluorine containing compound. Further embodiments include vulcanizable rubber compositions comprising these polymers, and tires including such compositions. Additional advantages of this invention will become readily apparent to those skilled in this art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 1 shows the impact of the addition of PNP compounds to nickel catalyzed 1,3-butadiene polymerization.

DETAILED DESCRIPTION

The present disclosure is directed towards a polymerization catalyst composition that comprises (a) a transition metal containing compound; (b) an alkylating agent; (c) a fluorine containing compound; and (d) a compound containing two phosphorous atoms connected by a nitrogen containing divalent organic group ("PNP compound").

As used hereinafter, the term "catalyst" is a substance that permits or accelerates a chemical reaction. A catalyst works by providing an alternative reaction pathway to the chemical reaction than that without the use of the catalyst. Typically, the rate of the reaction is increased as this alternative route has lower activation energy than the reaction route not mediated by the catalyst. The lower the activation energy, the faster the rate of the reaction. A catalyst could have one or more catalytic sites where the chemical reaction could occur. A catalyst could be a well defined, single compound or contain one active compound within a mixture of compounds. Alternately, a mixture of components can produce a catalyst species or multiple catalytic species which may or may not be specifically identified. Examples of catalysts include Ziegler-Natta catalyst systems.

The term "PNP compound" may be defined as any compound containing two phosphorous atoms connected by a nitrogen containing a divalent organic group.

The term "alkylating agent" is any substance that introduces a hydrocarbyl group into a compound.

Generally, the transition metal-containing compound (a) is a component of a Ziegler-Natta type catalyst for the polymerization of dienes. Such compounds are well known to those skilled in the art, and include those compounds containing a transition metal of groups 4 through 12 of the periodic table. Such compounds may contain transition metals such as titanium, cobalt, and nickel.

Of the transition metal containing compounds those that contain nickel are preferred. The nickel-containing compound may be any nickel salt or nickel salt of organic acid containing from about 1 to 20 carbon atoms. Some representative examples of nickel-containing compounds include, but are not limited to, nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\eta^3$-allyl)nickel, bis(π-cyclootta-1,5-diene)nickel, bis($\eta^3$-allyl nickel trifluoroacetate), nickel tetracarbonyl, nickel boroacylate, and mixtures thereof. Other suitable nickel-containing compounds include, but are not limited to, nickel carboxylate borates, such as those having the formula $(RCOONiO)_3B$, where R is a hydrogen atom or a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Specific examples of nickel carboxylate borates include nickel neodecanoate borate, nickel hexanoate borate, nickel naphthenate borate, nickel stearate borate, nickel octoate borate, nickel 2-ethylhexanoate borate, and mixtures thereof.

In one embodiment, the nickel-containing compound is a nickel salt of a carboxylic acid or an organic complex compound of nickel. In another embodiment, the nickel containing compound may be nickel naphthenate, nickel octanoate, nickel neodecanoate, or mixtures thereof. Nickel 2-ethylhexanoate, which is commonly referred to as nickel octanoate, is commonly used as the nickel-containing compound due to economic factors and solubility in hydrocarbons.

Suitable cobalt-containing compounds include, but are not limited to, cobalt benzoate, cobalt acetate, cobalt boroacylate, cobalt naphthenate, bis(α-furyl dioxime) cobalt, cobalt octanoate, cobalt palmitate, cobalt stearate, cobalt acetylacetonate, bis(salicylaldehyde ethylene diimine)cobalt, cobalt salicylaldehyde, dicobalt octacarbonyl and mixtures thereof.

Various alkylating agents, or mixtures thereof, can be used as component (b) of the catalyst composition. In certain embodiments, such alkylating agents are soluble in hydrocarbon solvents. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 13 metals (Groups IA, IIA, and IIIA metals). In one embodiment, the organometallic compound selected from organolithium, organoaluminum, organozinc and organomagnesium compounds, In another embodiment, the alkylating agent is selected from organoaluminum and organomagnesium compounds.

In one or more embodiments, organoaluminum compounds refer to any compound containing at least on aluminum-carbon bond. In another embodiment, organoaluminum compounds include those represented by the formula $AlR_nX_{3-n}$, where each R, which may be the same or different, is a monovalent organic group that is attached to the aluminum atom via a carbon atom, where each X, which may be the same or different, is a hydrogen atom, a halogen atom, a carboxylate group, an alkoxide group, or an aryloxide group, and where n is a number from 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. The number n may include fractional numbers, such as when the organoaluminum compounds comprises, for example but not limited to, aluminum sesquihalides.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichlorides include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds includes aluminoxanes. Aluminoxanes include oligomeric linear aluminoxanes that can be represented by the general formula:

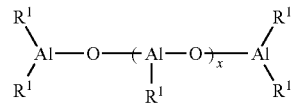

and oligomeric cyclic aluminoxanes that can be represented by the general formula:

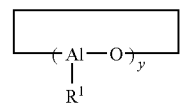

where x may be an integer of 1 to about 100, and in other embodiments about 10 to about 50; y may be an integer of 2 to about 100, and in other embodiments about 3 to about 20; and where each $R^1$, which may be the same or different, may be a monovalent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutyl aluminum hydride are employed in combination.

One class of organomagnesium compounds that can be utilized may be represented by the formula $MgR_2$, where each R, which may be the same or different, is a monovalent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, tin, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, butylethylmagnesium, and mixtures thereof.

Another class of organomagnesium compounds that can be utilized include those that may be represented by the formula RMgX, where R is a monovalent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, tin, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Fluorine containing compounds which may be utilized as component (c) of the catalyst compositions herein include, but are not limited to, boron trifluoride complexes with ethers, alcohols or mixtures thereof, hydrogen fluoride and hydrogen fluoride complexes with ethers, alcohols or mixtures thereof. Mixtures of the foregoing fluorine containing compounds may also be employed. In one embodiment the fluorine containing compounds for use in the catalyst composition of the invention are the boron trifluoride complexes.

Ethers which may be utilized in forming the complexes may be represented by the formula R'OR wherein R and R' are selected from the group consisting of alkyl, cycloalkyl, aryl, alkaryl and arylalkyl radicals containing from 1 to 30 carbon atoms and R and R' may be the same or different. The R's may also be joined through a common carbon bond to form a cyclic ether with the ether oxygen being an integral part of the cyclic structure such as tetrahydrofuran, furan, or dioxane. Illustrative examples of ethers which may be suitably employed include dimethyl, diethyl, dibutyl, diamyl, and diisopropyl ethers, ethyl methyl ether, dibenzyl ether and the like. In one embodiment, the ether complexes are selected from boron trifluoride diethyl etherate, boron trifluoride dibutyl etherate, hydrogen fluoride diethyl etherate and hydrogen fluoride dibutyl etherate.

Alcohols which may be utilized in forming the complexes may be represented by the formula ROH wherein R is selected from the group consisting of alkyl, cycloalkyl, aryl, and arylalkyl radicals containing from 1 to 30 carbon atoms. Illustrative examples of alcohols which may be suitably employed include methanol, ethanol, n-propanol, isopropanol, n-butanol, hexanol, cyclohexanol, pentanol, octanol, decanol, dodecanol, benzyl alcohol, phenol and the like. In one embodiment, the alcohol complexes are selected from $BF_3$-ethanol, $BF_3$-hexanol, $BF_3$-octanol, HF-ethanol, HF-octanol, or mixtures thereof. In another embodiment, the alcohol complexes are slected from $BF_3$-ethanol, $BF_3$-hexanol, $BF_3$-octanol, or mixtures thereof.

The complexes may be prepared by various procedures. Thus, the boron trifluoride or hydrogen fluoride complexes may be prepared by simply dissolving appropriate amounts of the ether or alcohol complexing agents in a suitable solvent and appropriate amounts of the boron trifluoride or hydrogen fluoride in a suitable solvent and then mixing the two solvent systems. The mixing should be conducted in the absence of water vapor. An additional method would be to dissolve the boron trifluoride or hydrogen fluoride in a suitable solvent and then add the alcohol or ether to the resulting solution. Alternatively, the complexes could be prepared by dissolving the alcohol or ether complexing agent in a suitable solvent and then bubble the gaseous boron trifluoride or hydrogen fluoride through the system until all of the complexing agent has reacted. As illustrated in certain of the examples below, the boron trifluoride-alcohol complexes can also be prepared by means of a substitution reaction in which the alcohol is reacted with a boron trifluoride-ether complex.

PNP compounds useful as component (d) of the catalyst composition include those compounds represented by the following formula:

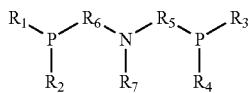

where $R_1$, $R_2$, $R_3$, and $R_4$ are each independently a monovalent organic group, $R_5$ and $R_6$ are each independently a bond, a divalent organic group or a divalent organic group that is substituted with a hydrocarbylene group connecting $R_5$ and $R_6$, and $R_7$ is a monovalent organic group, a hydrogen atom or a metal selected from groups 1 or 2 of the periodic table.

In one or more embodiments, monovalent organic groups may include hydrocarbyl groups or substituted hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms.

In one or more embodiments, divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene groups include hydrocarbylene groups in which one or more hydrogen atoms have been replaced by a substituent such as an alkyl group or alkylene group. In one or more embodiments, the hydrocarbylene groups may include a dihydrocarbylsilyl group. In one or more embodiments, these groups may include two, or the appropriate minimum number of carbon atoms to form the group, to 20 carbon atoms.

In one or more embodiments, $R_1$, $R_2$, $R_3$ and $R_4$ are each independently selected from an aryl group including from about 6 to about 20 carbon atoms. In other embodiments, $R_5$ and $R_6$ are selected from alkylene groups from about 1 to about 10 carbon atoms. In further embodiments, R5 and R6 are selected from arylene groups from about six to twenty carbon atoms.

In particular embodiments, $R_5$ and $R_6$ are divalent organic groups that are substituted with a hydrocarbylene group connecting $R_5$ and $R_6$. In particular embodiments, the hydrocarbylene group connecting $R_5$ and $R_6$ forms a compound with the general formula

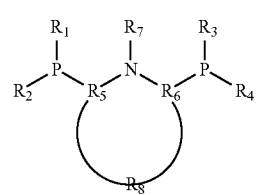

where $R_1$, $R_2$, $R_3$, and $R_4$ are each independently a monovalent organic group, $R_5$ and $R_6$ are each independently a divalent organic group, $R_7$ is a monovalent organic group, a hydrogen atom or a metal selected from groups 1 or 2 of the periodic table and $R_8$ is a bond or a divalent organic group connecting $R_5$ and $R_6$. The monovalent and divalent organic groups can be the same as those listed above.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a monovalent organic group such as a hydrocarbyl group.

Exemplary metals of groups 1 or 2 of the periodic table include lithium, sodium, potassium, rubidium, cesium, francium, beryllium, magnesium, calcium, strontium, barium, and radium.

Particular embodiments employ PNP compounds utilizing structures 1 through 8 as depicted below:

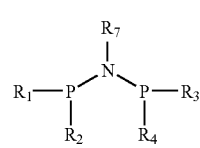

1

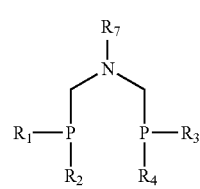

2

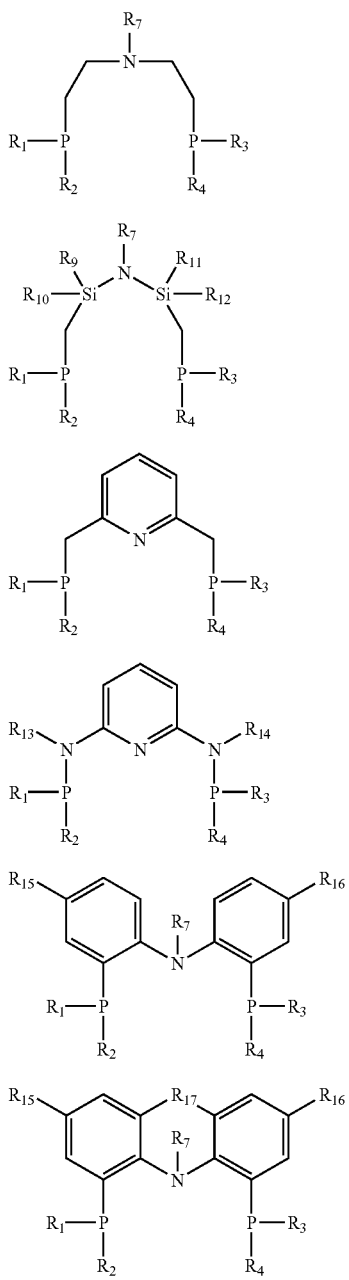

where $R_1$, $R_2$, $R_3$, $R_4$, $R_8$, $R_9$, $R_{10}$, $R_{11}$, $R_{12}$, $R_{13}$, $R_{14}$, $R_{15}$, and $R_{16}$ are each independently a monovalent organic group, $R_{17}$ is a divalent organic group and $R_7$ is a monovalent organic group, a hydrogen atom or a metal selected from groups 1 or 2 of the periodic table. The monovalent and divalent organic groups can be the same as those listed above.

In one or more embodiments, useful PNP compounds include N-lithio-bis(2-dimethylphosphinophenyl)amide, N-lithio-bis(2-diethylphosphinophenyl)amide, N-lithio-bis(2-di-n-propylphosphinophenyl)amide, N-lithio-bis(2-diisopropylphosphinophenyl)amide, N-lithio-bis(2-di-t-butylphosphinophenyl)amide, N-lithio-bis(2-dicyclohexylphosphinophenyl)amide, N-lithio-bis(2-diphenylphosphinophenyl)amide, N-sodio-bis(2-dimethylphosphinophenyl)amide, N-sodio-bis(2-diethylphosphinophenyl)amide, N-sodio-bis(2-di-n-propylphosphinophenyl)amide, N-sodio-bis(2-diisopropylphosphinophenyl)amide, N-sodio-bis(2-di-t-butylphosphinophenyl)amide, N-sodio-bis(2-dicyclohexylphosphinophenyl)amide, N-sodio-bis(2-diphenylphosphinophenyl)amide, bis(2-dimethylphosphinophenyl)amine, bis(2-diethylphosphinophenyl)amine, bis(2-di-n-propylphosphinophenyl)amine, bis(2-diisopropylphosphinophenyl)amine, bis(2-di-t-butylphosphinophenyl)amine, bis(2-dicyclohexylphosphinophenyl)amine, bis(2-diphenylphosphinophenyl)amine, bis(2-dimethylphosphinophenyl)methylamine, bis(2-diethylphosphinophenyl)methylamine, bis(2-di-n-propylphosphinophenyl)methylamine, bis(2-diisopropylphosphinophenyl)methylamine, bis(2-di-t-butylphosphinophenyl)methylamine, bis(2-dicyclohexylphosphinophenyl)methylamine, bis(2-diphenylphosphinophenyl)methylamine, bis(2-dimethylphosphinophenyl)ethylamine, bis(2-diethylphosphinophenyl)ethylamine, bis(2-di-n-propylphosphinophenyl)ethylamine, bis(2-diisopropylphosphinophenyl)ethylamine, bis(2-di-t-butylphosphinophenyl)ethylamine, bis(2-dicyclohexylphosphinophenyl)ethylamine, bis(2-diphenylphosphinophenyl)ethylamine, bis(2-dimethylphosphinophenyl)phenylamine, bis(2-diethylphosphinophenyl)phenylamine, bis(2-di-n-propylphosphinophenyl)phenylamine, bis(2-diisopropylphosphinophenyl)phenylamine, bis(2-di-t-butylphosphinophenyl)phenylamine, bis(2-dicyclohexylphosphinophenyl)phenylamine, bis(2-diphenylphosphinophenyl)phenylamine, N-lithio-bis(2-diethylphosphino)methyl)amide, N-lithio-bis(2-di-n-propylphosphino)methyl)amide, N-lithio-bis(2-diisopropylphosphino)methyl)amide, N-lithio-bis(2-di-t-butylphosphino)methyl)amide, N-lithio-bis(2-dicyclohexylphosphino)methyl)amide, N-lithio-bis(2-diphenylphosphino)methyl)amide, N-sodio-bis(2-dimethylphosphino)methyl)amide, N-sodio-bis(2-diethylphosphino)methyl)amide, N-sodio-bis(2-di-n-propylphosphino)methyl)amide, N-sodio-bis(2-diisopropylphosphino)methyl)amide, N-sodio-bis(2-di-t-butylphosphino)methyl)amide, N-sodio-bis(2-dicyclohexylphosphino)methyl)amide, N-sodio-bis(2-diphenylphosphino)methyl)amide, bis(2-dimethylphosphino)methyl)amine, bis(2-diethylphosphino)methyl)amine, bis(2-di-n-propylphosphino)methyl)amine, bis(2-diisopropylphosphino)methyl)amine, bis(2-di-t-butylphosphino)methyl)amine, bis(2-dicyclohexylphosphino)methyl)amine, bis(2-diphenylphosphino)methyl)amine, bis(2-dimethylphosphino)methyl)methylamine, bis(2-diethylphosphino)methyl)methylamine, bis(2-di-n-propylphosphino)methyl)methylamine, bis(2-diisopropylphosphino)methyl)methylamine, bis(2-di-t-butylphosphino)methyl)methylamine, bis(2-dicyclohexylphosphino)methyl)methylamine, bis(2-diphenylphosphino)methyl)methylamine, bis(2-dimethylphosphino)methyl)ethylamine, bis(2-diethylphosphino)methyl)ethylamine, bis(2-di-n-propylphosphino)methyl)ethylamine, bis(2-diisopropylphosphino)methyl)ethylamine, bis(2-di-t-butylphosphino)methyl)ethylamine, bis(2-dicyclohexylphosphino)methyl)ethylamine, bis(2-diphenylphosphino)methyl)ethylamine, bis(2-dimethylphosphino)methyl)phenylamine, bis(2-diethylphosphino)methyl)phenylamine, bis(2-di-n-propylphosphino)methyl)phenylamine, bis(2-diisopropylphosphino)methyl)phenylamine, bis(2-di-t- butylphosphino)methyl)phenylamine, bis(2-dicyclohexylphosphino)methyl)phenylamine, bis(2-diphenylphosphino)methyl)phenylamine, N-lithio-bis(2-diethylphosphino)ethyl)amide, N-lithio-bis(2-di-n-propylphosphino)ethyl)amide, N-lithio-bis(2-diisopropylphosphino)ethyl)amide, N-lithio-bis(2-di-t-butylphosphino)ethyl)amide, N-lithio-bis(2-dicyclohexylphosphino)ethyl)amide, N-lithio-bis(2-diphenylphosphino)ethyl)amide, N-sodio-bis(2-dimethylphosphino)ethyl)amide, N-sodio-bis(2-diethylphosphino)ethyl)amide, N-sodio-bis(2-di-n-propylphosphino)ethyl)amide, N-sodio-bis(2-diisopropylphosphino)ethyl)amide, N-sodio-bis(2-di-t-butylphosphino)ethyl)amide, N-sodio-bis(2-dicyclohexylphosphino)ethyl)amide, N-sodio-bis(2-diphenylphosphino)ethyl)amide, bis(2-dimethylphosphino)ethyl)methylamine, bis(2-diethylphosphino)ethyl)methylamine, bis(2-di-n-propylphosphino)ethyl)methylamine, bis(2-diisopropylphosphino)ethyl)methylamine, bis(2-di-t-butylphosphino)ethyl)methylamine, bis(2-dicyclohexylphosphino)ethyl)methylamine, bis(2-diphenylphosphino)ethyl)methylamine, bis(2-dimethylphosphino)ethyl)ethylamine, bis(2-diethylphosphino)ethyl)ethylamine, bis(2-di-n-propylphosphino)ethyl)ethylamine, bis(2-diisopropylphosphino)ethyl)ethylamine, bis(2-di-t-butylphosphino)ethyl)ethylamine, bis(2-dicyclohexylphosphino)ethyl)ethylamine, bis(2-diphenylphosphino)ethyl)ethylamine, bis(2-dimethylphosphino)ethyl)phenylamine, bis(2-diethylphosphino)ethyl)phenylamine, bis(2-di-n-propylphosphino)ethyl)phenylamine, bis(2-diisopropylphosphino)ethyl)phenylamine, bis(2-di-t-butylphosphino)ethyl)phenylamine, bis(2-dicyclohexylphosphino)ethyl)phenylamine, bis(2-diphenylphosphino)ethyl)phenylamine, 2,6-bis(dimethylphosphino)pyridine, 2,6-bis(diethylphosphino)pyridine, 2,6-bis(di-n-propylphosphino)pyridine, 2,6-bis(diisopropylphosphino)pyridine, 2,6-bis(di-t-butylphosphino)pyridine, 2,6-bis(dicyclohexylphosphino)pyridine, 2,6-bis(diphenylphosphino)pyridine, N,N'-bis(dimethylphosphino)-2,6-diaminopyridine, N,N'-bis(diethylphosphino)-2,6-diaminopyridine, N,N'-bis(di-n-propylphosphino)-2,6-diaminopyridine, N,N'-bis(diisopropylphosphino)-2,6-diaminopyridine, N,N'-bis(dicyclohexylphosphino)-2,6-diaminopyridine, and N,N'-bis(diphenylphosphino)-2,6-diaminopyridine.

In one embodiment, the transition metal-containing compound is present in a catalytic amount of from about 0.01 mmol transition metal-containing compound/100 g monomer to about 0.4 mmol transition metal-containing compound/100 g monomer, and preferably is present in a catalytic amount of from about 0.02 mmol transition metal-containing compound/100 g monomer to about 0.2 mmol transition metal-containing compound/100 g monomer. Even more preferably, the transition metal-containing compound is present in a catalytic amount of from about 0.04 mmol transition metal-containing compount/100 g monomer to about 0.15 mmol transition metal-containing compound/100 g monomer. The PNP compound may be present in a catalytic amount of from about 0.01 equivalent PNP compound/transition metal-containing compound to about 10 equivalents. More preferably, the PNP compound is present in a catalytic amount of from about 0.1 equivalent PNP compound/transition metal containing compound to about 2 equivalents. Still more preferably, the PNP compound is present in a catalytic amount of from about 0.1 equivalent PNP compound/transition metal containing compound to about 0.5 equivalents. The alkylating agent may be present in a catalytic amount of from about 0.15 mmol alkylating agent/100 g monomer to about 20.0 mmol alkylating agent 1/100 g monomer. More preferably, the alkylating agent is present in a catalytic amount of from about 0.20 mmol alkylating agent/100 g monomer to about 6.0 mmol alkylating agent/100 g monomer. Still more preferably, the alkylating agent is present in a catalytic amount of from about 0.30 mmol alkylating agent/100 g monomer to about 2.0 mmol alkylating agent/100 g monomer. The fluorine-containing compound may be present in a catalytic amount of from about 0.01 mmol fluorine/100 g monomer to about 12.0 mmol fluorine/100 g monomer, and preferably is present in a catalytic amount of about 0.04 mmol fluorine/100 g monomer to about 6.0 mmol fluorine/100 g monomer. Even more preferably, the fluorine-containing compound may be present in a catalytic amount of from about 0.1 mmol fluorine/100 g monomer to about 5 mmol fluorine/100 g monomer.

Catalyst components (a), (b), (c) and (d) interact to form the active catalyst. Accordingly, the optimum concentration for any one component is dependent upon the concentration of each of the other components. In the catalyst system of this invention, the polymerization of a 1,3-diene monomer to diene polymer may be conducted using a broad range of catalyst component concentrations. Thus, the molar ratio of catalyst components (a):(b):(c):(d) (defined above) may range from about 1:1:1:0.01 to about 1:1000:1000:10. The preferred molar ratios of catalyst components (a):(b):(c):(d) are from 1:10:10:0.1 to 1:50:50:1.

The catalyst composition may be formed by combining or mixing the metal-containing compound, the PNP compound, the alkylating agent, and the fluorine-containing compound. Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this disclosure can be formed by using one of the following methods.

First, the catalyst composition may be formed in situ by adding the catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. In one embodiment, the metal-containing compound is added first, followed by the PNP compound, followed by the alkylating agent, followed by the fluorine-containing compound.

Second, the catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of at least one conjugated diene monomer. That is, the catalyst ingredients are pre-mixed in the presence of a small amount of conjugated diene monomer at an appropriate temperature, which is generally from about −20° C. to about 80° C. The amount of conjugated diene monomer that is used for pre-forming the catalyst can range from about 1 to about 500 moles per mole, more preferably from about 5 to about 250 moles per mole, and even more preferably from about 10 to about 100 moles per mole of the metal-containing compound. The resulting catalyst composition is then added to the remainder of the conjugated diene monomer that is to be polymerized. The pre-formed catalyst may be formed by adding the catalyst ingredients and at least one conjugated diene monomer either in a stepwise or simultaneous manner. When adding the catalyst ingredients and conjugated diene monomer in a stepwise manner, the sequence in which the catalyst ingredients and conjugated diene monomer are added is not critical. In one embodiment, the conjugated diene monomer is added first, followed by the metal-containing compound, followed by the alkylating agent, followed by the PNP compound, followed by the fluorine-containing compound.

Fourth, the catalyst composition may be formed by using a two-stage procedure. The first stage involves combining the alkylating agent with the metal-containing compound and PNP compound in the absence of conjugated diene monomer or in the presence of a small amount of conjugated diene monomer at an appropriate temperature, which is generally from about −20° C. to about 80° C. In the second stage, the foregoing reaction mixture and the remaining catalyst component (i.e., the fluorine-containing compound), if necessary, are charged in either a stepwise or simultaneous manner to the remainder of the conjugated diene monomer that is to be polymerized. When a solution of the catalyst composition or one or more of the catalyst ingredients is prepared outside the polymerization system as set forth in the foregoing methods, an organic solvent or carrier may be employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, hexanes, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents may be used.

In one embodiment the polymerization is carried out in an organic solvent as the diluent. In a further embodiment, a solution polymerization system is employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized is in a condensed phase. Also, in certain embodiments, the catalyst ingredients are soluble or suspended within the organic solvent. In other words, the catalyst ingredients are preferably not impregnated onto a catalyst support.

In certain embodiments, an amount of organic solvent in addition to the amount of organic solvent that may be used in preparing the catalyst composition is preferably added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized is not limited to any particular amount. In certain embodiments, the concentration of the monomer present in the polymerization medium at the beginning of the polymerization should be in a range of from about 3% to about 80% by weight, alternatively from about 5% to about 50% by weight, and alternatively from about 10% to about 30% by weight of the combined weight of the polymerization medium and monomer.

The polymerization may also be carried out by means of bulk polymerization, which refers to a polymerization environment where no separate solvents are employed. The bulk polymerization can be conducted either in a condensed liquid phase or in a gas phase.

The polymerization may be carried out as a batch process, a continuous process, or a semi-continuous process. In the semi-continuous process, monomer is intermittently charged as needed to replace that monomer already polymerized. In any case, the polymerization may be conducted under anaerobic conditions by using an inert protective gas such as nitrogen, argon or helium, with moderate to vigorous agitation. The polymerization temperature may vary widely from a low temperature, such as about −10° C. or below, to a high temperature such as about 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization stopping agent to inactivate the catalyst. Typically, the period of polymerization is from about 20 minutes to about 24 hours and will depend on other polymerization conditions such as temperature as well as the choice of catalyst. Typically, the stopping agent employed is a protic compound, which includes, but is not limited to, an alcohol, a carboxylic acid, an inorganic acid, water, or a mixture thereof.

In one embodiment a stopping agent mixture for use in the present disclosure includes an inorganic base in an amine-water mixture. When $BF_3$ is used as the fluorine-containing compound and a mixture of water and an amine are used to stop the polymerization, the water reacts with the organoaluminum compound and/or $BF_3$ to deactivate the catalyst components, leaving the amine available to react with the trialkylboranes. The use of an amine-water mixture is detailed in commonly assigned U.S. Pat. No. 6,596,825, entitled "Low Gel High Cis Polydiene," the disclosure of which is incorporated herein by reference in its entirety. The inorganic base can be used to neutralize the acidic by-products of the stopping and polymerization reactions. This allows for the addition of less amine and reduces or eliminates corrosion in the reaction vessel by raising the pH of the system.

The inorganic base/amine/water mixture may be added in conjunction or in series. In one embodiment the mixture may be added in series. The molar ratio of amine:water may be about 1:100, and in a more specific embodiment about 1:500. The water component of the stopping agent mixture may additionally include an alcohol. In one embodiment the alcohols are one or more of methanol, ethanol, isopropanol, propanol, and butanol. When included, a water:alcohol ratio may be about 1:500, and in a more specific embodiment, about 1:50. Alternately, the water can be omitted from the stopping agent mixture such that the stopping agent mixture includes only an amine/inorganic base mixture.

Suitable amines include ammonia, ammonium hydroxide, primary amine, secondary amine, tertiary amine, aliphatic amine and aromatic amine. Exemplary amines include, but are not limited to, pyridine, aniline, benzylamine, n-butylamine, cyclohexylamine, diethylamine, diisopropylamine, dimethylamine, diphenylamine, ethylamine, ethylenediamine, hexamethylene diamine, N,N-diethylcyclohexylamine, N,N-dimethylcyclohexylamine, N,N,N'-trimethyl ethylene diamine, N,N,N'N'-tetramethyl ethylene diamine (TMEDA); and substituted pyridines such as N,N-dimethylaminopyridine (DMAP), 4-pyrrolidinopyridine, and 4-piperidinopyridine. TMEDA may be used as the amine component of the stopping agent mixture, with or without the use of water.

Another suitable stopping agent mixture includes a carboxylic acid and an inorganic base. The inorganic base includes those described above. Suitable carboxylic acids include those represented by the formula:

R—COOH wherein R is selected from the group consisting of alkyl, cycloalkyl and arylalkyl substituted or unsubstituted containing from 3 to 20 carbon atoms. A carboxylic acid that can be used for use in the stopping agent mixture is 2-ethyl hexanoic acid (EHA). A metal salt of a carboxylic acid may also be added to the stopping agent mixture. Thus, another suitable stopping agent mixture includes a mixture of EHA and the calcium salt of EHA. As with the amine based suitable stopping agent mixture described above, water may or may not be included in the carboxylic acid based stopping agent mixture. Again, the inorganic base is thought to react with acid byproducts believed to be produced during polymerization as well as any acidic products that may result from residual water reacting with the EHA or other carboxylic acid used.

In certain embodiments, when used with both the amine and the carboxylic acid, the amount of inorganic base added to the reaction mixture is preferably enough to maintain the pH in the reaction vessel above 7. In one embodiment, an amount of inorganic base is added to adjust the pH to about 7-9. Although not intended to be limiting, a suitable amount for use in the present disclosure is an amount equal to the molar equivalent of the fluorine ions present in the reaction mixture from the fluorine-containing compound. The use of the inorganic base in the stopping agent mixture reduces the amount of amine necessary to effectively stop the polymerization.

An antioxidant such as 2,6-di-t-butyl-4-methylphenol may be added along with, before, or after the addition of the stopping agent. The amount of the antioxidant employed is usually in the range of 0.2% to 1% by weight of the polymer product.

When the polymerization has been stopped, polymer product can be recovered from the polymerization mixture by utilizing conventional procedures of desolventization and drying. For instance, the polymer may be isolated from the polymerization mixture by coagulating the polymerization mixture with an alcohol such as methanol, ethanol, or isopropanol, followed by filtration, or by steam distilling the solvent and the unreacted monomer, followed by filtration. The isolated polymer product is then dried to remove residual amounts of solvent and water. Alternatively, the polymer may be isolated from the polymerization mixture by directly drum drying the polymer cement. The polymer product can be dried using any convenient method such as vacuum drying, drum drying, extruder drying, and the like.

The catalyst composition of this disclosure exhibits high catalytic activity for polymerizing conjugated dienes into high cis-1,4-polydienes. Although one preferred embodiment is directed toward the polymerization of 1,3-butadiene into cis-1,4-polybutadiene, other conjugated dienes can also be polymerized. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The high cis-1,4-polydienes polymerized using the catalyst composition disclosed herein will typically have cis-1,4 content of at least about 90%; preferably at least about 92%; even more preferably at least about 95%, and even more preferably at least about 96%. The number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity ($M_w/M_n$) of these polymers may be from about 1.5 to about 5.0, and in other embodiments from about 2.0 to about 4.0. Molecular weight distribution is commonly known as the value obtained when dividing the weight-average molecular weight by the number-average molecular weight.

The polymers of this invention are particularly useful in preparing tire components. These tire components can be prepared by using the high cis polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more alpha-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 Kirk-Othmer, Encyclopedia of Chemical Technology, 365-468, (3rd Ed. 1982), particularly Vulcanization Agents and Auxiliary Materials, 390-402, and A. Y. Coran, Vulcanization in Encyclopedia of Polymer Science and Engineering, (2nd Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, sidewalls, body ply skins, bead filler, and the like. Preferably, the high cis polydienes are employed in tread or sidewall formulations. In one or more embodiments, these formulations may include from about 10 to about 100% by weight, in other embodiments from about 35 to about 90% by weight, and in other embodiments from about 50 to 80% by weight of the high cis polydiene based on the total weight of the rubber within the formulation. In one or more embodiments, the preparation of vulcanizable compositions and the construction and curing of the tire is not affected by the practice of this invention.

In one or more embodiments, the vulcanizable rubber composition may be prepared by forming an initial masterbatch that includes the rubber component and filler (the rubber component optionally including the high cis polydiene of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in Stephens, The Compounding and Vulcanization of Rubber, in Rubber Technology (2nd Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Synthesis of Novel Catalyst and High cis Polybutadiene
A nickel-based catalyst system comprising nickel and PNP compounds was used for the synthesis of polybutadiene. Addition of a PNP compound to a transition metal containing polymerization catalyst formulation increased the cis content of the resulting polydiene from 96.8 to 97.5%.

The concentration of the total catalyst composition employed in the method of the invention can vary considerably and is dependent upon factors such as purity, rate of polymerization desired, temperature, and the like. Accordingly, specific overall concentrations of the catalyst compositions cannot be set forth except to state that such concentrations are catalytically effective amounts. Some specific concentrations and ratios which produce polybutadiene polymers having the desired properties are illustrated in the examples below.

As mentioned above, the diene polymers produced by the method of the invention have a high content of cis-1,4 addition along with good green strength and tack. Thus, such diene polymers have cis-1,4 addition contents of greater than 95% and more commonly from about 96 to about 99%.

Example 1

General Preparation of M(PNP) Complex

A metal-PNP complex, wherein the metal could be a transition metal, could be prepared as follows. A solution of the metal salt is prepared in an appropriate dry, degassed solvent in an inert atmosphere. Such solvents for metal carboxylates may include hexanes, toluene, THF, or mixed hydrocarbons. A solution of Li(PNP)•(THF)$_2$ in an appropriate dry, degassed solvent such as toluene, benzene, or THF is added slowly in a molar ratio of 1:1 PNP:M to the metal salt solution. The solvents are removed under reduced pressure, resulting in a solid M(PNP) complex.

Example 2

Preparation of Lithium bis(2-diphenylphosphinophenyl)amide

Preparation of lithium bis(2-diphenylphosphinophenyl) amide was accomplished using a 3-step modified procedure from L. -C. Liang et al. Organometallics 2003, 22(15), 3007.

Step 1: Synthesis of di(2-fluorophenyl)aniline. In a 3-necked 500 mL round bottom flask was dissolved 14.8 g (0.13 mol) of 2-fluoroaniline and 23.4 g (0.14 mol) 1-fluoro-2-bromobenzene in 50 mL of dry, degassed toluene. To the flask was added 0.15 g Pd(OAc)$_2$ (6.6×10$^{-4}$ mol), 0.54 g bis[2-(diphenylphosphino)phenyl] ether (1.0×10$^{-3}$ mol) and 17.9 g (0.19 mol) of t-BuONa and the solution refluxed under nitrogen for 48 hours. The reaction was quenched by addition of 50 mL of deionized water. The aqueous layer was separated via extraction, and the organic layer containing the product was dried using MgSO$_4$. The product was distilled under reduced pressure, giving a clear, viscous oil product. boiling point=58-70° C. @2×10$^{-3}$ mmHg.

Step 2: Synthesis of bis(2-diphenylphosphinophenyl)amine. To a 500 mL Schlenk flask, was added via cannula 100 mL of 0.5 M KPPh$_2$ (0.05 mol) in tetrahydrofuran (THF). The solvent was removed in vacuo, leaving an orange solid. In a 100 mL round bottom flask, was dissolved 5.0 g (0.02 mol) of di(2-fluorophenyl)aniline in 40 mL dry 1,4-dioxane. This solution was added via cannula to the dry KPPh$_2$. The reaction was refluxed under nitrogen for 7 days, at which point 100 mL of degassed deionized (DI) water was added to quench. Approximately 100 mL of degassed CH$_2$Cl$_2$ was added. The organic and aqueous layers were separated and extracted, giving a reddish-brown organic product solution. This solution was dried using MgSO$_4$ and the solvent was removed under reduced pressure. The resulting brown solid product was washed with degassed acetone, and recrystallized using a 60/40 v/v solution of CH$_2$Cl$_2$/EtOH. The product is a white, crystalline solid.

Step 3: Synthesis of lithium bis(2-diphenylphosphinophenyl) amide. In a 250 mL 3-necked round bottom flask, 3.1 g (5.7×10$^{-3}$ mol) of bis(2-diphenylphosphinophenyl)amine was dissolved in 100 mL dry, degassed THF. The contents of the flask were chilled to −40° C. in a dry ice/isopropanol bath, and 5.7 ML of 1.6 M nBuLi/hexanes was added dropwise using a syringe over a 10 minute period. The reaction was stirred overnight under nitrogen, gradually warming to room temperature. The solvent was removed, and the resulting yellow solid was triturated with 5 mL aliquots of dry hexane, producing a yellow powdery solid.

Example 3

Synthesis of High cis-Polybutadiene

Five dry, nitrogen purged and rubber capped 750 mL bottles were assembled and charged with the following: 85 g of dry hexanes, 165 g of a 22.6 weight percent butadiene in hexanes blend, 0.45 mL of a 0.05 M nickel octoate borate (NiOB) in hexanes solution, 0.75 mL of 0.68 M triisobutylaluminum (TIBA) in hexanes solution, and 0.6 mL of a 1.0 M BF$_3$•hexanol solution. The ratio of components was as follows: Ni/Al/B=1/22/26. Varying amounts of a 0.04 M solution of lithium bis(2-diphenylphosphinophenyl)amide ligand in toluene were added to change the PNP/Ni ratio between 0 and 1 equivalent of PNP compound per nickel atom. The order of component addition was as follows: Hexanes, 1,3-butadiene (22.6 wt % in hexanes), NiOB solution, of lithium bis(2-diphenylphosphinophenyl)amide solution, TIBA solution, and BF$_3$•hexanol solution. After the addition was completed, the bottles were tumbled in a 65° C. water bath for 90 minutes. The bottles were then removed from the bath and the polymerization was terminated by addition of 2 mL of isopropanol. Percent conversion of 1,3-butadiene was determined using GC headspace analysis of the residual monomer. The polymers were isolated by coagulation into isopropanol and volatiles were subsequently removed using a drum dryer. Table 1 shows the amount of reagents used for the experiments conducted in bottles 1 through 5.

TABLE 1

| BOTTLE # | 1 | 2 | 3 | 4 | 5 |
|---|---|---|---|---|---|
| g 22.6 wt % BD/hex Blend Used | 165.4 | 165.0 | 165.0 | 165.2 | 166.6 |
| g Hexanes Used | 85.4 | 85.4 | 86.2 | 85.2 | 85.4 |
| mmol Ni | 0.023 | 0.023 | 0.023 | 0.023 | 0.023 |
| mmol TIBA | 0.51 | 0.51 | 0.51 | 0.51 | 0.51 |
| mmol BF$_3$•hexanol | 0.60 | 0.60 | 0.60 | 0.60 | 0.60 |
| Al/Ni ratio | 22.7 | 22.7 | 22.7 | 22.7 | 22.7 |
| B/Ni ratio | 26.7 | 26.7 | 26.7 | 26.7 | 26.7 |
| mmol PNP | 0.0 | 0.006 | 0.011 | 0.017 | 0.023 |
| PNP/Ni ratio | 0.0 | 0.25 | 0.50 | 0.75 | 1.00 |
| Temperature, ° C. | 65.0 | 65.0 | 65.0 | 65.0 | 65.0 |
| Rxn Time, hours | 1.5 | 1.5 | 1.5 | 1.5 | 1.5 |
| % Conversion (GC) | 96.0 | 95.5 | 87.6 | 44.6 | 25.6 |
| % cis content | 96.8 | 96.9 | 97.2 | 97.5 | Not measured |
| ML$_{(1+4)}$ | 55.6 | 56.0 | 61.9 | Not Measured | Not measured |
| M$_n$ (kg/mol) | 105.6 | 132.2 | 148.1 | 147.1 | Not measured |
| M$_w$/M$_n$ | 3.71 | 3.13 | 3.00 | 3.59 | Not measured |

Table 2 shows the amount of reagents used for the experiments conducted in bottles 6 through 10. For bottles 6 through 10, the order of addition was as follows: hexanes, NiOB solution, lithium bis(2-diphenylphosphinophenyl)amide solution, butadiene/hexanes blend, TIBA, and BF$_3$•hexanol. All other reaction conditions were identical to the experiments described in Table 1.

TABLE 2

| BOTTLE # | 6 | 7 | 8 | 9 | 10 |
|---|---|---|---|---|---|
| g 22.6 wt % BD/hex Blend Used | 166.0 | 165.6 | 164.8 | 164.6 | 170.0 |
| g Hexanes Used | 85.4 | 85.6 | 85.2 | 85.0 | 85.0 |
| mmol Ni | 0.023 | 0.023 | 0.023 | 0.023 | 0.023 |
| mmol TIBA | 0.51 | 0.51 | 0.51 | 0.51 | 0.51 |
| mmol BF$_3$/hexanol | 0.60 | 0.60 | 0.60 | 0.60 | 0.60 |
| Al/Ni ratio | 22.7 | 22.7 | 22.7 | 22.7 | 22.7 |
| B/Ni ratio | 26.7 | 26.7 | 26.7 | 26.7 | 26.7 |
| mmol PNP | 0.0 | 0.006 | 0.011 | 0.017 | 0.023 |
| PNP/Ni ratio | 0.0 | 0.25 | 0.50 | 0.75 | 1.00 |
| Temperature, ° C. | 65.0 | 65.0 | 65.0 | 65.0 | 65.0 |
| Rxn Time, hours | 1.5 | 1.5 | 1.5 | 1.5 | 1.5 |
| % Conversion | 96.7 | 92.1 | 80.9 | 39.1 | 28.2 |
| % cis | 96.4 | 96.8 | 97.1 | 97.4 | Not measured |
| ML$_{(1+4)}$ | 54.6 | 55.2 | 60.7 | Not measured | Not measured |
| M$_n$ (kg/mol) | 128.7 | 124.9 | 132.6 | 181.6 | Not measured |
| M$_w$/M$_n$ | 3.00 | 3.11 | 3.30 | 2.88 | Not measured |

The abbreviation used in Tables 1 and 2 have the following meanings:

BD=1,3-butadiene monomer
NiOB=nickel octoate borate
TIBA=triisobutylaluminum
$BF_3$=boron trifluoride
PNP=lithium bis(2-diphenylphosphinophenyl)amide
Al/Ni ratio=molar ratio of aluminum compound to nickel compound in the catalyst system
B/Ni ratio=molar ratio of boron compound to nickel compound in catalyst system
PNP/Ni ratio=molar ratio of PNP compound to Ni in the catalyst system
% Conversion=amount of butadiene converted to polybutadiene
% cis=amount of cis as measured by infrared spectroscopy (IR).
$ML_{(1+4)}$=measured Mooney viscosity of the bulk elastomer sample The Mooney viscosity ($ML_{1+4}$) of the polymers were determined at 100° C. by using a Alpha Technologies Mooney viscometer with a large rotor, a one-minute warm-up time, and a four-minute running time.

The reactions were then analyzed for monomer conversion, polymer molecular weight, cis content, and Mooney viscosity. The results are summarized in FIG. 1.

In FIG. 1, the term "In-situ Ni-PNP" refers to a solution of nickel salt and a solution of ligand salt that are mixed together before exposure to monomer or alkylating agent.

Application in Rubber Compounds

A rubber compound having the formulation shown in Table 3 could be prepared to demonstrate the beneficial properties of a rubber compound containing a polymer synthesized with the high cis polybutadiene rubber of the embodiments of the invention.

TABLE 3

Rubber compound formulation with carbon black

| Ingredient | Parts by weight (phr) |
|---|---|
| Initial Mix Stage | |
| Polymer Sample | 80 |
| Polyisoprene | 20 |
| Carbon black | 50 |
| Oil | 10 |
| Wax | 2 |
| Antioxidant | 1 |
| Stearic acid | 2 |
| Final Mix Stage | |
| Zinc oxide | 2.5 |
| Accelerators | 1.3 |
| Sulfur | 1.5 |

The polymer synthesized above in Example 3 could be employed to prepare vulcanizable rubber compositions, cured, and analyzed for various physical and dynamic properties.

This application discloses several numerical range limitations that support any range within the disclosed numerical ranges even though a precise range limitation is not stated verbatim in the specification because the embodiments could be practiced throughout the disclosed numerical ranges. With respect to the use of the term, "about," those having skill in the art will be able to assign a specific value to the term depending on the context in which the term is used; except that, however, one may presume that suc term shall generally mean plus or minus 10%, in the absence of such context. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A catalyst composition comprising a transition metal-containing compound, a PNP compound, an alkylating agent, and a fluorine containing compound selected from the group consisting of boron trifluoride; boron trifluoride complexes with ethers, alcohols, or mixtures thereof; hydrogen fluoride; hydrogen fluoride complexes with ethers, alcohols, or mixtures thereof; and combinations thereof.

2. The catalyst composition of claim 1, wherein the PNP compound comprises a compound represented by the following formula:

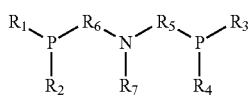

where $R_1$, $R_2$, $R_3$, and R are each independently a monovalent organic group, $R_5$ and $R_6$ are each independently a bond, a divalent organic group or $R_5$ and $R_6$ are divalent organic groups that are substituted with a hydrocarbylene group connecting $R_5$ and $R_6$, and $R_7$ is a monovalent organic group, a hydrogen atom or a metal selected from groups 1 or 2 of the periodic table.

3. The catalyst composition of claim 2, wherein $R_5$ and $R_6$ are independently divalent organic groups that are substituted with a hydrocarbylene group connecting $R_5$ and $R_6$ to form a compound with the general formula

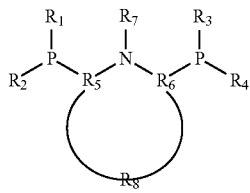

wherein $R_1$, $R_2$, $R_3$, and $R_4$ are each independently a monovalent organic group, $R_7$ is a monovalent organic group, a hydrogen atom or a metal of groups 1 or 2 of the periodic table and $R_8$ is a bond or a divalent organic group connecting $R_5$ and $R_6$.

4. The catalyst composition of claim 2, wherein the PNP compound is selected from the group consisting of structures 1 through 8:

1
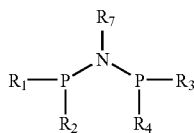

2
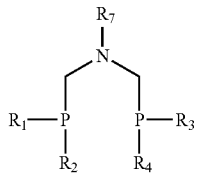

3
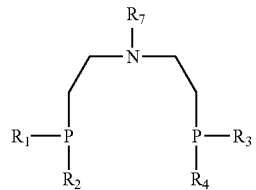

4
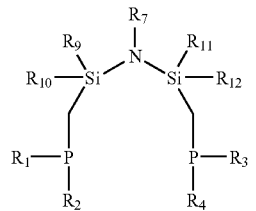

5
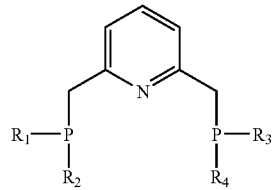

6
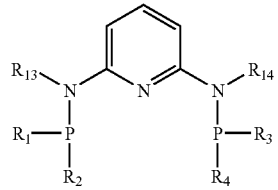

7
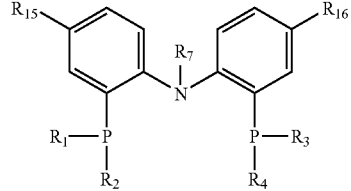

8
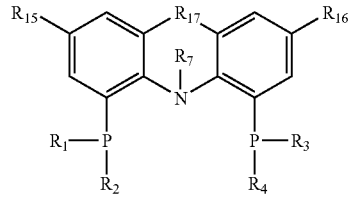

and combinations thereof, wherein $R_1$, $R_2$, $R_3$, $R_4$, $R_9$, $R_{10}$, $R_{11}$, $R_{12}$, $R_{13}$ $R_{14}$, $R_{15}$, and $R_{16}$ are each independently a monovalent organic group, $R_{17}$ is a divalent organic group and $R_7$ is a monovalent organic group, a hydrogen atom or a metal of groups 1 or 2 of the periodic table.

5. The catalyst composition of claim 1, wherein the PNP compound is selected from the group consisting of N-lithio-bis(2-dimethylphosphinophenyl)amide, N-lithio-bis(2-diethylphosphinophenyl) amide, N-lithio-bis(2-di-n-propylphosphinophenyl)amide, N-lithio-bis(2-diisopropylphosphinophenyl)amide, N-lithio-bis(2-di-t-butylphosphinophenyl)amide, N-lithio-bis (2-dicyclohexylphosphinophenyl)amide, N-lithio-bis(2-diphenylphosphinophenyl) amide, N-sodio-bis (2-dimethylphosphinophenyl) amide, N-sodio-bis(2-diethylphosphinophenyl) amide, N-sodio-bis(2-di-n-propylphosphinophenyl)amide, N-sodio-bis (2-diisopropylphosphinophenyl) amide, N-sodio-bis(2-di-t-butylphosphinophenyl) amide, N-sodio-bis(2-dicyclohexylphosphinophenyl)amide, N-sodio-bis(2-diphenylphosphinophenyl) amide, bis(2-dimethylphosphinophenyl)amine, bis(2-diethylphosphinophenyl) amine, bis(2-di-n-propylphosphinophenyl)amine, bis(2-diisopropylphosphinophenyl) amine, bis(2-di-t-butylphosphinophenyl) amine, bis(2-dicyclohexylphosphinophenyl) amine, bis(2-diphenylphosphinophenyl)amine, bis(2-dimethylphosphinophenyl) methylamine, bis(2-diethylphosphinophenyl)methylamine, bis(2-di-n-propylphosphinophenyl) methylamine, bis(2-diisopropylphosphinophenyl)methylamine, bis(2-di-t-butylphosphinophenyl) methylamine, bis(2-dicyclohexylphosphinophenyl)methylamine, bis(2-diphenylphosphinophenyl) methylamine, bis(2-dimethylphosphinophenyl)ethylamine, bis(2-diethylphosphinophenyl) ethylamine, bis(2-di-n-propylphosphinophenyl)ethylamine, bis(2-diisopropylphosphinophenyl) ethylamine, bis(2-di-t-butylphosphinophenyl)ethylamine, bis(2-dicyclohexylphosphinophenyl) ethylamine, bis(2-diphenylphosphinophenyl)ethylamine, bis(2-dimethylphosphinophenyl) phenylamine, bis(2-diethylphosphinophenyl)phenylamine, bis(2-di-n-propylphosphinophenyl) phenylamine, bis(2-diisopropylphosphinophenyl)phenylamine, bis(2-di-t-butylphosphinophenyl) phenylamine, bis(2-dicyclohexylphosphinophenyl)phenylamine, bis(2-diphenylphosphinophenyl) phenylamine, N-lithio-bis(2-diethylphosphino)methyl)amide, N-lithio-bis (2-di-n-propylphosphino) methyl)amide, N-lithio-bis(2-diisopropylphosphino) methyl)amide, N-lithio-bis(2-di-t-butylphosphino)methyl)amide, N-lithio-bis (2-dicyclohexylphosphino)methyl)amide, N-lithio-bis(2-diphenylphosphino)methyl)amide, N-sodio-bis (2-dimethylphosphino)methyl)amide, N-sodio-bis(2-diethylphosphino)methyl)amide, N-sodio-bis(2-di-n-propylphosphino)methyl)amide, N-sodio-bis(2-diisopropylphosphino) methyl)amide, N-sodio-bis(2-di-t-butylphosphino)methyl) amide, N-sodio-bis (2-dicyclohexylphosphino)methyl) amide, N-sodio-bis(2-diphenylphosphino)methyl)amide, bis (2-dimethylphosphino)methyl)amine, bis(2-diethylphosphino)methyl)amine, bis(2-di-n-propylphosphino) methyl)amine, bis(2-diisopropylphosphino)methyl)amine, bis(2-di-t-butylphosphino) methyl)amine, bis(2-dicyclohexylphosphino)methyl)amine, bis(2-diphenylphosphino) methyl)amine, bis(2-dimethylphosphino)methyl)methylamine, bis(2-diethylphosphino) methyl)methylamine, bis(2-di-n-propylphosphino)methyl)methylamine, bis(2-diisopropylphosphino) methyl)methylamine, bis(2-di-t-butylphosphino)methyl)methylamine, bis(2-dicyclohexylphosphino)methyl)methylamine, bis(2-diphenylphosphino) methyl)methylamine, bis(2-dimethylphosphino)methyl)ethylamine, bis(2-diethylphosphino) methyl)ethylamine, bis(2-di-n-propylphosphino)methyl)ethylamine, bis(2-diisopropylphosphino) methyl)ethylamine, bis(2-di-t-butylphosphino)methyl)ethylamine, bis(2-dicyclohexylphosphino) methyl)ethylamine, bis(2-diphenylphosphino)methyl)ethylamine, bis(2-dimethylphosphino) methyl)phenylamine, bis(2-diethylphosphino)methyl)phenylamine, bis(2-di-n-propylphosphino) methyl)phenylamine, bis(2-diisopropylphosphino)methyl)phenylamine, bis(2-di-t-butylphosphino)methyl)phenylamine, bis(2-dicyclohexylphosphino) methyl)phenylamine, bis(2-diphenylphosphino)methyl)phenylamine, N-lithio-bis (2-diethylphosphino)ethyl)amide, N-lithio-bis(2-di-n-propylphosphino)ethyl)amide, N-lithio-bis (2-diisopropylphosphino)ethyl)amide, N-lithio-bis(2-di-t-butylphosphino) ethyl)amide, N-lithio-bis(2-dicyclohexylphosphino)ethyl) amide, N-lithio-bis(2-diphenylphosphino) ethyl)amide, N-sodio-bis(2-dimethylphosphino)ethyl)amide, N-sodio-bis (2-diethylphosphino) ethyl)amide, N-sodio-bis(2-di-n-propylphosphino)ethyl)amide, N-sodio-bis(2-diisopropylphosphino) ethyl)amide, N-sodio-bis(2-di-t-butylphosphino) ethyl)amide, N-sodio-bis (2-dicyclohexylphosphino)ethyl) amide, N-sodio-bis(2-diphenylphosphino)ethyl)amide, bis (2-dimethylphosphino) ethyl)methylamine, bis(2-diethylphosphino)ethyl)methylamine, bis(2-di-n-propylphosphino) ethyl)methylamine, bis(2-diisopropylphosphino)ethyl)methylamine, bis(2-di-t-butylphosphino) ethyl)methylamine, bis(2-dicyclohexylphosphino)ethyl)methylamine, bis(2-diphenylphosphino) ethyl)methylamine, bis(2-dimethylphosphino)ethyl)ethylamine, bis(2-diethylphosphino) ethyl)ethylamine, bis(2-di-n-propylphosphino)ethyl)ethylamine, bis(2-diisopropylphosphino) ethyl)ethylamine, bis(2-di-t-butylphosphino)ethyl)ethylamine, bis(2-dicyclohexylphosphino) ethyl)ethylamine, bis(2-diphenylphosphino)ethyl)ethylamine, bis(2-dimethylphosphino) ethyl)phenylamine, bis(2-diethylphosphino)ethyl)phenylamine, bis(2-di-n-propylphosphino) ethyl)phenylamine, bis(2-diisopropylphosphino)ethyl)phenylamine, bis(2-di-t-butylphosphino) ethyl)phenylamine, bis(2-dicyclohexylphosphino)ethyl)phenylamine, bis(2-diphenylphosphino) ethyl)phenylamine, 2,6-bis (dimethylphosphino)pyridine, 2,6-bis (diethylphosphino) pyridine, 2,6-bis(di-n-propylphosphino)pyridine, 2,6-bis (diisopropylphosphino)pyridine, 2,6-bis(di-t-butylphosphino)pyridine, 2,6-bis (dicyclohexylphosphino)pyridine, 2,6-bis(diphenylphosphino)pyridine, N,N'-bis (dimethylphosphino)-2,6-diaminopyridine, N,N'-bis(diethylphosphino)-2,6-diaminopyridine, N,N'-bis(di-n-propylphosphino)-2,6-diaminopyridine, N,N'-bis (diisopropylphosphino)-2,6-diaminopyridine, N,N'-bis (dicyclohexylphosphino)-2,6-diaminopyridine, and N,N'-bis (diphenylphosphino)-2,6-diaminopyridine, and combinations thereof.

6. The catalyst composition of claim 1, wherein the PNP compound comprises N-lithio-bis(2-diphenylphosphinophenyl)amide.

7. The catalyst composition of claim 1, wherein the transition-metal-containing compound is selected from the group consisting of nickel-containing compounds, titanium-containing compounds, cobalt-containing compounds, and combinations thereof.

8. The catalyst composition of claim 1, wherein the metal of the transition-metal-containing compound comprises nickel, the PNP compound comprises N-lithio-bis(2-diphenylphosphinophenyl) amide, the alkylating agent comprises trialkylaluminum, and the fluorine containing compound comprises boron trifluoride.

9. The catalyst composition of claim 1, further comprising an inert solvent.

10. The catalyst composition of claim 1, wherein the transition-metal-containing compound comprises a nickel-containing compound selected from the group consisting of nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis(η3-allyl)nickel, bis(π-cycloocta-1,5-diene) nickel, bis(η3-allyl nickel trifluoroacetate), nickel tetracarbonyl, nickel boroacylate, nickel carboxylate borate, nickel 2-ethylhexanoate and combinations thereof.

11. The catalyst composition of claim 1, wherein the transition-metal-containing compound comprises a cobalt-containing compound selected from the group consisting of cobalt benzoate, cobalt acetate, cobalt naphthenate, bis(αfuryl dioxime) cobalt, cobalt octanoate, cobalt palmitate, cobalt stearate, cobalt acetylacetonate, bis(salicylaldehyde ethylene diimine)cobalt, cobalt salicylaldehyde, dicobalt octacarbonyl and combinations thereof.

12. The catalyst composition of claim 1, wherein the alkylating agent is selected from the group consisting of organolithium compounds, organoaluminum compounds, organozinc compounds, organomagnesium compounds, and combinations thereof.

13. A catalyst composition comprising a transition metal-containing compound, a PNP compound, an alkylating agent, and a fluorine containing compound, wherein the metal of the transition metal-containing compound is selected from groups 4 through 12 metals of the periodic system, and wherein the fluorine containing compound is selected from the group consisting of boron trifluoride; boron trifluoride complexes with ethers, alcohols, or mixtures thereof; hydrogen fluoride; hydrogen fluoride complexes with ethers, alcohols, or mixtures thereof; and combinations thereof.

14. The catalyst composition of claim 13, wherein the PNP compound comprises a compound represented by the following formula:

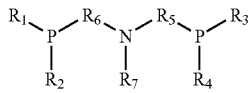

where $R_1$, $R_2$, $R_3$, and $R_4$ are each independently a monovalent organic group, $R_5$ and $R_6$ are each independently a bond, a divalent organic group or $R_5$ and $R_6$ are divalent organic groups that are substituted with a hydrocarbylene group connecting $R_5$ and $R_6$, and $R_7$ is a monovalent organic group, a hydrogen atom or a metal selected from groups 1 or 2 of the periodic table.

15. A method of preparing a polymer comprising polymerizing a diene monomer in the presence of a composition comprising a transition metal-containing compound, a PNP compound, an alkylating agent, and a fluorine containing compound selected from the group consisting of boron trifluoride; boron trifluoride complexes with ethers, alcohols, or mixtures thereof; hydrogen fluoride; hydrogen fluoride complexes with ethers, alcohols, or mixtures thereof; and combinations thereof.

16. The method of claim 15, wherein the PNP compound comprises a compound represented by the following formula:

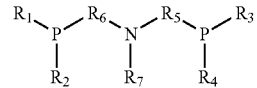

where $R_1$, $R_2$, $R_3$, and $R_4$ are each independently a monovalent organic group, $R_5$ and $R_6$ are each independently a bond, a divalent organic group or $R_5$ and $R_6$ are divalent organic groups that are substituted with a hydrocarbylene group connecting $R_5$ and $R_6$, and $R_7$ is a monovalent organic group, a hydrogen atom or a metal selected from groups 1 or 2 of the periodic table.

17. The method of claim 15, wherein the metal of the transition-metal-containing compound comprises nickel, wherein the PNP compound comprises N-lithio-bis(2-diphenylphosphinophenyl)amide, the alkylating agent comprises trialkylaluminum, and the fluorine containing compound comprises boron trifluoride.

18. The method of claim 15, wherein the polymer has a cis content of at least 90%.

19. The method of claim 15, wherein the monomer is selected from the group consisting of 1,3-butadiene and isoprene, and combinations thereof.

20. The method of claim 15, wherein the PNP compound and the transition metal-containing compound are present in a molar ratio from about 0.01 to about 1.00.

21. A method of manufacturing polybutadiene having a polydispersity below 5 comprising polymerizing a diene monomer in the presence of a composition comprising a transition metal-containing compound, a PNP compound, an alkylating agent, and a fluorine containing compound, wherein the transition metal-containing compound, the PNP compound, the alkylating agent and the fluorine containing compound are added into a reactor in a stepwise manner, and wherein the fluorine containing compound is selected from the group consisting of boron trifluoride; boron trifluoride complexes with ethers, alcohols, or mixtures thereof; hydrogen fluoride; hydrogen fluoride complexes with ethers, alcohols, or mixtures thereof; and combinations thereof.

22. The method of claim 21, wherein the PNP compound comprises a compound represented by the following formula:

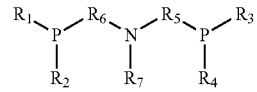

where $R_1$, $R_2$, $R_3$, and $R_4$ are each independently a monovalent organic group, $R_5$ and $R_6$ are each independently a bond, a divalent organic group or $R_5$ and $R_6$ are divalent organic groups that are substituted with a hydrocarbylene group connecting $R_5$ and $R_6$, and $R_7$ is a monovalent organic group, a hydrogen atom or a metal selected from groups 1 or 2 of the periodic table.

23. The method of claim 21, wherein the metal of the transition-metal-containing compound comprises nickel, wherein the PNP compound comprises N-lithio-bis(2-diphenylphosphinophenyl)amide, the alkylating agent comprises trialkylaluminum, and the fluorine containing compound comprises boron trifluoride.

* * * * *